United States Patent
Takahashi

(10) Patent No.: US 7,102,674 B2
(45) Date of Patent: Sep. 5, 2006

(54) CHARGE TRANSFER DEVICE

(75) Inventor: Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 667 days.

(21) Appl. No.: 09/995,319

(22) Filed: Nov. 26, 2001

(65) Prior Publication Data

US 2002/0063790 A1    May 30, 2002

(30) Foreign Application Priority Data

Nov. 27, 2000 (JP) .............................. 2000-359941
Sep. 3, 2001 (JP) .............................. 2001-265822

(51) Int. Cl.
*H04N 3/14* (2006.01)
*H04N 5/335* (2006.01)

(52) U.S. Cl. ....................... 348/294; 348/311; 330/277

(58) Field of Classification Search ................ 348/294, 348/297, 298, 300, 301–304, 307–31
See application file for complete search history.

(56) References Cited

U.S. PATENT DOCUMENTS

| 6,366,321 B1 * | 4/2002 | Yonemoto ................... 348/308 |
| 6,552,324 B1 * | 4/2003 | Kothari et al. .......... 250/214 A |
| 6,686,957 B1 * | 2/2004 | Johnson et al. .......... 348/222.1 |
| 2002/0000950 A1 * | 1/2002 | Tonosaki et al. ............... 345/5 |
| 2003/0058002 A1 * | 3/2003 | Horiguchi et al. .......... 326/121 |

* cited by examiner

*Primary Examiner*—David Ometz
*Assistant Examiner*—Yogesh Aggarwal
(74) *Attorney, Agent, or Firm*—Hogan & Hartson LLP

(57) ABSTRACT

In a solid-state imaging device, power consumption is reduced in an output section of a charge transfer device. Control transistors $T_{S1}$, $T_{S2}$, $T_{S3}$ are provided in a source follower amplification circuit constituting an output amplifier of a CCD image sensor. The control transistor is switched on and off by switching a gate voltage in accordance with the operation state of the charge transfer device. When the imaging device is in a standby mode, the control transistor is turned off to suspend operation of the source follower amplification circuit.

17 Claims, 3 Drawing Sheets

CHARGE TRANSFER DEVICE

BACKGROUND OF THE INVENTION

1. Field of the Invention

The present invention relates to a charge transfer device, and more particularly to power saving in an output section of a charge transfer device.

2. Description of the Related Art

FIG. 1 is a schematic circuit diagram illustrating the structure of an output section of a solid-state imaging device using a CCD image sensor. Information charges corresponding to each pixel generated in an imaging section 2 of the CCD image sensor are sequentially transferred via a horizontal CCD register 4 to a floating diffusion layer 6.

The information charges are then converted into an image signal, which is a voltage signal and which is supplied, as an input, to an output amplifier 8. The output amplifier 8 is a source follower amplifier circuit in which a transistor is used for the load of a source and which, in this case, includes interconnected three-stage source followers. Each source follower circuit is connected between a power source $V_D$ and ground GND. An output signal from the floating diffusing layer 6, or a source follower output at the previous stage, is input to a gate of each of transistors $T_{D1}$, $T_{D2}$, $T_{D3}$ for amplification. To a source of each of the transistors $T_{D1}$, $T_{D2}$, $T_{D3}$, a drain of each of load transistors $T_{L1}$, $T_{L2}$, $T_{L3}$ is connected. These load transistors function as a constant current source for supplying a constant current between the source and the drain in accordance with a prescribed gate bias voltage.

A CCD output obtained from the source follower at the final stage as an output signal of the CCD image sensor is input into a peripheral circuit 10. In this peripheral circuit 10, the CCD output is received by an emitter follower amplifier circuit 12, and the amplified signal is then input to a front end circuit 14.

The conventional output amplifiers are designed such that a sufficient band can be obtained considering the frequency characteristics of an image signal obtained at the time of normal imaging operations. From the same point of view, the gate bias voltage is set to a predetermined value. Although, in order to improve the frequency characteristics, it is generally effective to increase current flowing in the source follower, this creates a disadvantage that power consumption in the source follower is increased. This disadvantage also appears in the emitter follower amplifier circuit, which is a peripheral circuit. More specifically, power consumption is increased because the current flowing in the emitter follower amplifier circuit must be increased as necessary to prevent deterioration of the frequency characteristics of a CCD output.

Further, because the output amplifier is continuously operating even when an image signal is not being generated, extraneous signals other than the image signal is also amplified in the output amplifier or the like, and is then input to an image signal processing circuit at the subsequent stage.

SUMMARY OF THE INVENTION

The present invention was conceived in view of the aforementioned problems of the related art and aims to provide a charge transfer device in which power consumption is reduced in an output section while image quality is preserved.

In accordance with a first aspect of the present invention, there is provided a charge transfer device comprising a charge transfer section for transferring, in packet units, an information charge, an output section provided on the output side of said charge transfer section for converting, in packet units, said information charge into a voltage, and a source follower amplification circuit for extracting the voltage obtained by said output section which has been subjected to impedance conversion, wherein said source follower amplification circuit comprises an amplification transistor which receives, at a gate, the voltage from said output section and outputs, from a source, an output signal corresponding to a change in the voltage; a load transistor connected between said amplification transistor and ground for causing a constant current to flow from said amplification transistor to the side of the ground; and a control transistor connected between said amplification transistor and a power source for controlling a current flowing from the power source to said amplification transistor.

An output amplifier for amplifying a signal in accordance with the information charges sequentially transferred and output is provided in the output section of the charge transfer device. The output amplifier is manufactured in the same process as the charge transfer device and is composed of source follower amplification circuits using MOSFETs provided in multiple stages. The source follower amplification circuit comprises a transistor for amplifying an input signal and a load transistor for supplying a constant current to the amplification transistor. The amount of the constant current supplied by the load transistor is determined in accordance with a gate bias voltage applied to the gate thereof. According to the present invention, the source follower amplification circuit further comprises a control transistor between a drain of the amplification transistor and a power source. By controlling the gate voltage of the control transistor, the current flowing in the source follower amplification circuit can be switched on and off or can be increased or decreased. Thus, the operation of the source follower amplification circuit can be halted when not necessary, and the current flowing in the source follower amplification circuit can be variable in accordance with the frequency characteristics or the like which are required, so that wasteful power consumption in the output amplifier in excess of the amount required can be avoided.

In accordance with a second aspect of the present invention, said control transistor is an enhancement type transistor.

According to the present invention, the control transistor basically turns off when a voltage of the power source connected to its drain is applied to the gate, so that a current flowing in the source follower amplification circuit is interrupted, thereby basically eliminating power consumption. The control transistor turns on, on the other hand, when the gate voltage is set to 0V. Here, a depression type transistor requires a gate voltage greater than the power source voltage so as to place the transistor into a sufficient off state. An enhancement type transistor, on the other hand, can be placed into an off state by a voltage lower than that required in the depression type transistor, and this is advantageous in generating a control signal. Namely, on/off action of the control transistor can be controlled using a signal which is typically used for driving the charge transfer device.

In accordance with a third aspect of the present invention, the gate of the control transistor and the gate of the load transistor are connected to a same input terminal of the charge transfer device.

According to the present invention, because the gate of the control transistor and the gate of the load transistor are connected to a common terminal, the number of input/output terminals of the charge transfer device can be reduced. When the control transistor is turned off, the operation of the source follower amplification circuit is basically in an off state. Therefore, at this time, the gate voltage applied to the load transistor may turn the load transistor either on or off.

In accordance with a fourth aspect of the present invention, a control signal generating circuit is provided between the gate of said control transistor and said input terminal for generating said control signal based on an input signal externally input to said input terminal, and said load transistor maintains an on state with regard to said input signal.

According to the present invention, the load transistor maintains an on state irrespective of the level of the input signal. It is not always possible to control the on/off state of the control transistor when such an input signal is directly applied to the gate of the control transistor. Accordingly, the control signal generating circuit is provided to convert the change in the voltage level of the input signal into a level change for turning the control transistor on/off. In this manner, when the control transistor is off, the load transistor is on and the output terminal of the output amplifier short-circuits to ground connected to the source of the load transistor. Namely, when the control transistor is off, the output terminal is set to a predetermined potential. Generally, in a peripheral circuit connected to the output terminal of the charge transfer device, an emitter follower amplification circuit or a source follower amplification circuit is used to receive an output from the charge transfer device. The amplification circuit is typically provided in the form of an emitter follower amplification circuit using NPN transistors or an N-channel source follower amplification circuit. When so provided, according to the charge transfer device of the present invention, when the control transistor is off, the emitter follower amplification circuit or the source follower amplification circuit is also off or in a low current state, so that power in the peripheral circuit can be reduced.

BRIEF DESCRIPTION OF THE DRAWINGS

These and other advantages of the invention will be explained in the description below, in connection with the accompanying drawings, in which.

DETAILED DESCRIPTION OF THE PREFERRED EMBODIMENTS

Preferred embodiments of the present invention will be described in further detail with reference to the accompanying drawings.

EMBODIMENT 1

Figure 1:
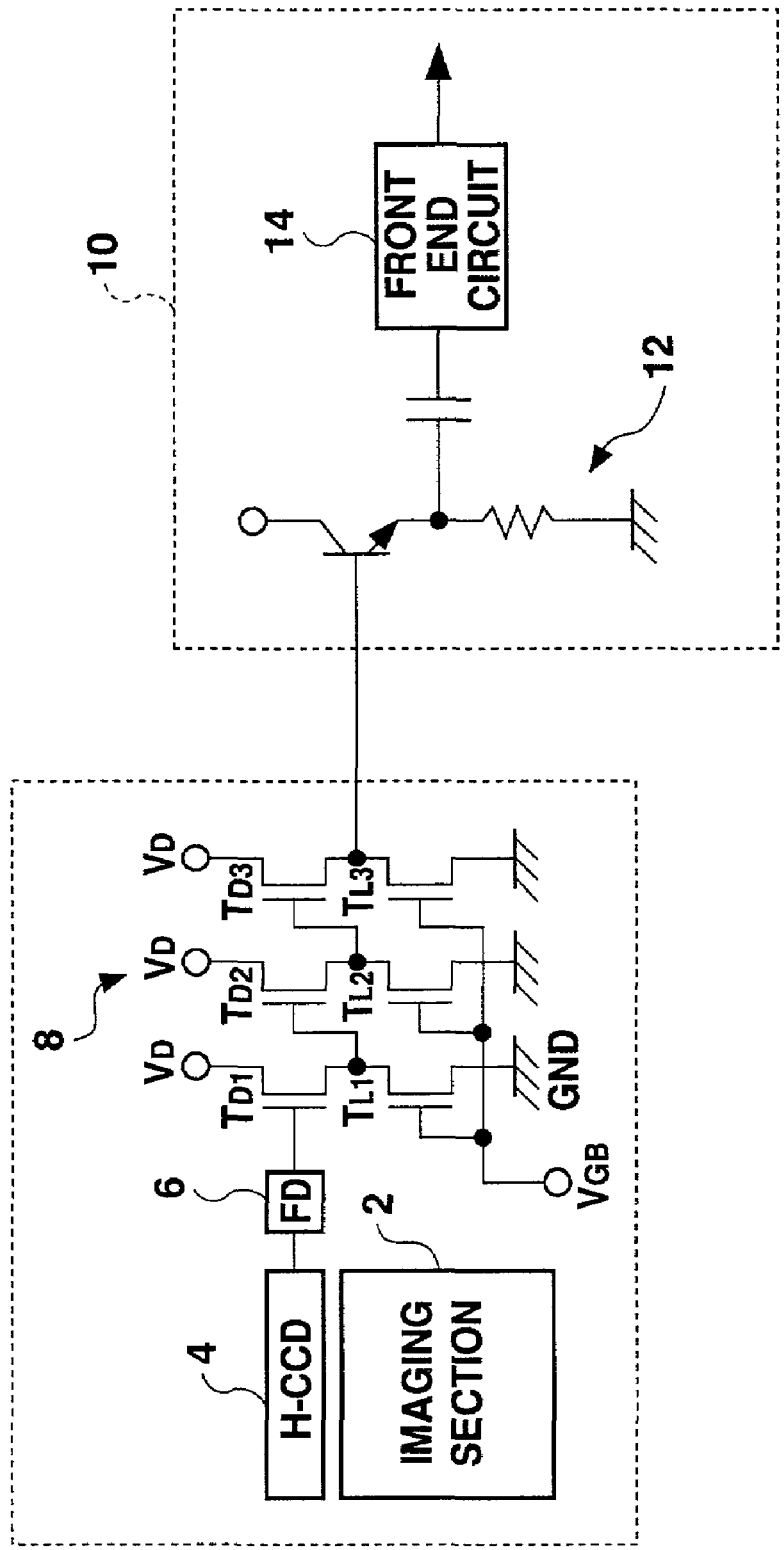
FIG. 1 is a schematic circuit diagram for explaining the structure of an output section of a prior art solid-state imaging device using a CCD image sensor.
Figure 2:
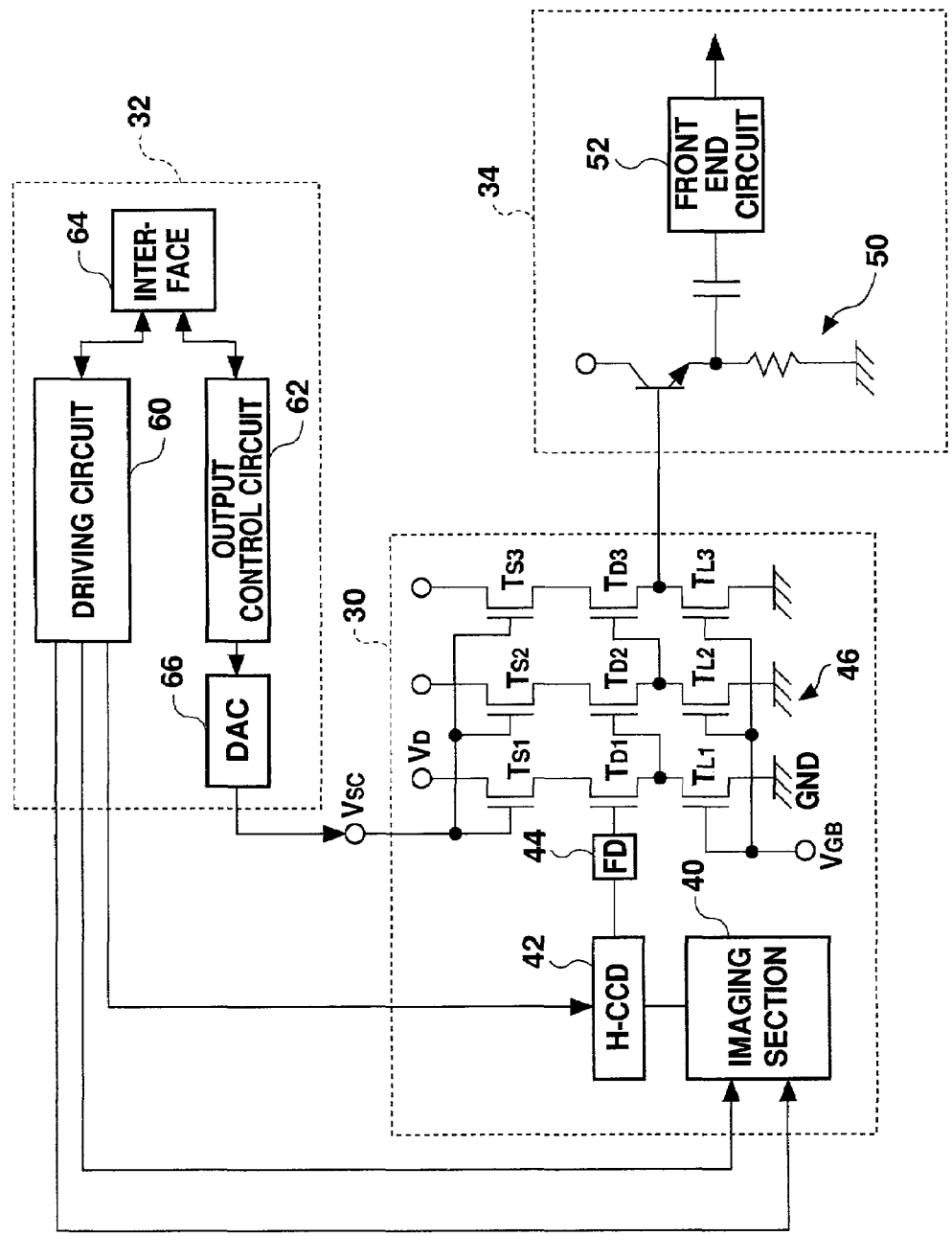
FIG. 2 is a schematic circuit diagram showing the structure of a solid-state imaging device in accordance with a first embodiment of the present invention.

FIG. 2 is a schematic view showing the circuit structure of a solid-state imaging device according to one embodiment of the charge transfer device of the present invention. The device of this embodiment uses a CCD image sensor 30 which is a type of a charge transfer device, and further comprises a CCD control LSI 32 for controlling the operation of the CCD image sensor 30 and a peripheral circuit 34 for processing an output signal of the CCD image sensor 30.

Information charges are generated corresponding to each pixel in an imaging section 40 of the CCD sensor 30, and are then read out, line by line, to be supplied to a horizontal CCD register 42 by means of a vertical CCD register. The information charges are then horizontally transferred and output to a floating diffusing layer 44 by the horizontal CCD register 42. The floating diffusing layer 44 outputs an image signal which is a voltage signal, in accordance with an amount of charge input from the horizontal CCD register 42, and the image signal is then input to an output amplifier 46.

The output amplifier 46 comprises plural stages of source follower circuits connected with each other. In the example use to illustrate this embodiment, three-stage source follower circuits are used. Each source follower circuit is connected between a power source $V_D$ and ground GND, and comprises a control transistor $T_{S1}$, $T_{S2}$, $T_{S3}$, a transistor for amplification $T_{D1}$, $T_{D2}$, $T_{D3}$, and a load transistor $T_{L1}$, $T_{L2}$, $T_{L3}$. Each of the amplification transistors $T_{D1}$, $T_{D2}$, $T_{D3}$ receives, at a gate thereof, an output signal of the floating diffusing layer 44 or a source follower output at the previous stage. To a source of each of the transistors $T_{D1}$, $T_{D2}$, $T_{D3}$, a drain of each of the load transistors $T_{L1}$, $T_{L2}$, $T_{L3}$ is connected. The load transistors function as a constant current source for supplying a constant current between the source and the drain in accordance with a prescribed gate bias voltage. The gate of each load transistor is connected to a gate bias input terminal $V_{GB}$ of the CCD image sensor 30 so that a constant voltage is applied to the gate. Further, each of the control transistors $T_{S1}$, $T_{S2}$, $T_{S3}$, is connected between the power source $V_D$ and the drain of each amplification transistor for controlling a current flowing in each source follower circuit. The gate of each control transistor is connected to a control terminal $V_{SC}$ of the CCD image sensor 30, to which a control voltage signal is input from the CCD control LSI 32. In this embodiment, each of the transistors $T_{S1} \sim T_{S3}$, $T_{D1} \sim T_{D3}$, and $T_{L1} \sim T_{L3}$ is an MOSFET formed on a substrate on which the imaging section 40 is also formed. More specifically, the transistors $T_{S1} \sim T_{S3}$ are P-channel enhancement type MOSFETs and the transistors $T_{D1} \sim T_{D3}$ and $T_{L1} \sim T_{L3}$ are N-channel depression type MOSFETs. The power source $V_D$ supplies a positive voltage, for example a voltage of 10~15V. In the device of the present embodiment, the control transistor functions as a switch for controlling on and off of the current flowing in the source follower circuit, and is constituted such that a current flowing in the source follower circuit is not limited in an on state. More specifically, the control transistor is formed to have an extremely large channel width so that the impedance of the channel is reduced.

A CCD output obtained from the source follower circuit at the final stage, as an output signal of the CCD image sensor, is input into the peripheral circuit 34. In this peripheral circuit 34, the CCD output is received by an emitter follower amplifier circuit 50, and the amplified signal is then input to a front end circuit 52. A video signal processing circuit (not shown) is further provided downstream of the front end circuit 52 for processing the video signal. This process includes, for example, image display on a monitor (not shown), and recording of an image signal onto a recording media as well as gain control and gamma correction. The emitter follower amplification circuit 50 comprises NPN type transistors as in the conventional art.

The CCD control LSI 32 is a semiconductor device on which a circuit for controlling the operation of the CCD image sensor 30 is integrated, and comprises a driving circuit 60 and an output control circuit 62.

The driving circuit 60 generates various types of clock pulses for controlling accumulation of a signal charge in the imaging section 40 and vertical and horizontal transfer of information charges using the CCD, and supplies the clock pulses to the CCD image sensor 30. For example, the driving circuit 60 supplies a vertical transfer clock pulse $\phi_V$, a horizontal transfer clock pulse $\phi_H$, a voltage pulse $\phi_{SH}$ for the operation of the electronic shutter, or the like.

The output control circuit 62 controls the operation of the output amplifier 46, and more specifically controls the gate voltage of the control transistors $T_{S1}$, $T_{S2}$, $T_{S3}$. The output control circuit 62 acquires information regarding the driving state of the driving circuit 60, and switches the gate voltage of the control transistors in accordance with the driving state for controlling on/off of the control transistors.

In the device of the present embodiment, the output control circuit 62 stores digital values corresponding to an on-voltage which is a gate voltage for switching the control transistor on and to an off-voltage which is a gate voltage for switching the control transistor off, and selects either one of the corresponding values for output. A DAC (Digital-to-Analog Converter) 66 generates a voltage in accordance with the digital value output from the output control circuit 62. The voltage thus generated is output, as a gate voltage, to the gate input terminal of the CCD image sensor 30. In the present embodiment, because the control transistor is of a P-channel enhancement type and the drain of the control transistor is connected to the power source $V_D$, it is possible to set the on-voltage to 0V and to set the off-voltage to a voltage of the power source $V_D$. Although the DAC 66 is used to generate a voltage signal in this example, a voltage signal may be generated directly by the output control circuit 62. The output control circuit 62 can be connected to an external system via an interface 64, so that the conditions can be set or changed from the external system, or the control transistors can be controlled under the control of the external system.

The operation regarding the output section of the CCD image sensor 30 will be described. In the device of the present embodiment, the output control circuit 62 sets the gate voltage of the control transistors $T_{S1}$, $T_{S2}$, $T_{S3}$, based on predetermined conditions.

For example, the on/off state of the control transistor is switched in accordance with a determination regarding whether or not the CCD output is a pixel signal. The output control circuit 62 turns the control transistor off during the period in which a pixel signal is not read out for the floating diffusing layer 44, corresponding to at least one of the horizontal blanking period and the vertical blanking period. On the other hand, during the period in which a pixel signal is read out for the floating diffusing layer 44, the control transistor is turned on. In this manner, during the period in which a pixel signal is read out, the output amplifier 46 is actuated to increase the voltage change generated in the floating diffusing layer 44 in accordance with the pixel signal and output it as a CCD output signal, and, during the period in which a pixel signal is not read out, the output amplifier 46 is basically deactivated. Namely, during the period in which a pixel signal is not read out, the current flowing in the source follower circuit which constitutes the output amplifier 46 can be reduced to substantially zero, thereby reducing power consumption.

Further, by basically deactivating the output amplifier 46 in the blanking period as described above, it is possible to prevent a noise signal which is not necessary for the CCD output from appearing in the blanking period. For example, due to the operation of the electronic shutter, in any of the horizontal blanking periods a voltage pulse may be applied to the substrate of the CCD image sensor 30 such that the signal charges accumulated in the pixel will be discharged to the substrate. Further, in the horizontal blanking period, a line transfer operation is performed for vertically transferring the signal charges corresponding to one line to the horizontal CCD register 42. Also, when the CCD image sensor 30 is a frame transfer type, a frame shift operation, in which the signal charges are vertically transferred at a high speed from the imaging region to the accumulation region, is performed in the vertical blanking period. In these operations performed during the blanking period, there is a possibility that the voltage pulse applied to the CCD image sensor 30 may cause a change in the potential of the floating diffusing layer 44, for example, which is then amplified in the output amplifier 46, to thereby cause an unnecessary voltage change in the CCD output. According to the device of this embodiment, during the blanking periods, the control transistor is switched off to basically deactivate the output amplifier 46, as described above, to prevent the transmission of the extraneous voltages to the front end circuit 52.

Also, according to the device of this embodiment, the CCD image sensor 30 can be set to a standby mode in which the output amplifier 46 is deactivated under the control of the gate voltage and imaging is performed by driving portions other than the output amplifier 46. The standby mode can reduce the power consumption of the output amplifier. When the standby mode is released, a rise time is not required for driving the imaging section 40 and the CCD register and a stable image signal can be immediately obtained in the CCD output.

According to the device of the present embodiment, by constituting the control transistor as an enhancement type MOSFET, the source follower amplification circuit is basically shut off completely when a voltage of the power source connected to the drain of the control transistor is applied as the gate voltage. Further, by setting the gate voltage to 0V, which is the ground voltage, for example, the control transistor is turned on. Thus, the control signal for turning on/off the control transistor can be generated within the range of the driving voltage of the source follower amplification circuit, which results in simplification of the circuit for generating the control signal.

Further, in many solid-state imaging devices, the emitter follower amplification circuit 50 is constituted using NPN transistors, and the amplification transistor and the load transistor of the output amplifier 46 are N-channel transistors. By employing the output amplifier 46 which uses the control transistors of the present invention, it is possible to reduce not only the power consumption of the output amplifier 46 itself as described above, but also to reduce power consumption of the emitter follower amplification circuit which is in a peripheral circuit, while preserving the most of the structure of the conventional devices as described above. This advantage is possible because, when the control transistor $T_{S3}$ of the final stage source follower circuit is on, a positive voltage which is an intermediate voltage between the ground potential and the positive voltage of the power source $V_D$ is applied to the base bias voltage of the emitter follower amplification circuit 50, and the emitter follower amplification circuit 50 is turned on. When the control transistor $T_{S3}$ is off, on the other hand, the load transistor $T_{L3}$ maintains its on state, so that the base of the emitter follower amplification circuit is connected to the ground via the load transistor $T_{L3}$. Namely, when the control transistor is off, the base bias voltage of the emitter follower amplification circuit shifts to the ground potential, so that the emitter follower amplification circuit is also deactivated.

This advantage can also be obtained with configurations wherein the CCD output is received by a source follower amplification circuit rather than by the emitter follower amplification circuit 50 in the peripheral circuit 34. More specifically, for the device of this embodiment with a structure in which the power source $V_D$ of the output amplifier 46 is a positive voltage, an N-channel MOSFET is used for a source follower amplification circuit of the peripheral circuit 34.

In the above-mentioned first embodiment, the transistors are controlled by a binary control of on and off. However, it is also possible that the output control circuit 62 changes the gate voltage of the control transistors in accordance with the operation state of the device, such that a current flowing in the source follower amplification circuit of the output amplifier 46 provides a plurality of different on states.

In a case of a digital camera, for example, the operation states thereof includes, as an imaging mode, a motion picture imaging mode and a still picture imaging mode, in addition to the standby mode in which a CCD output signal is not output from the output amplifier 46.

In the motion picture imaging mode, the driving circuit 60 causes the CCD image sensor 30 to repeat generation and reading of an image signal, so that a motion image is formed by a series of plural images. The motion image thus generated is displayed as a monitor image on a viewfinder through which an operator identifies an object. The motion image can also be recorded on a recording medium (not shown) in accordance with the operator's instructions. In the motion picture imaging mode, a very high resolution is not required due to the characteristics of human visual sensation or restriction on the resolution of a viewfinder, and therefore interlaced scanning can be performed. In the still picture imaging mode, on the other hand, the driving circuit 60 drives the CCD image sensor 30 for interlaced scanning, to thereby form a still image with a high resolution. Imaging of a still picture is performed by an operator's pressing a shutter button (not shown) after confirming the object on the monitor image. Specifically, a still picture imaging instruction signal is generated by pressing the shutter button. The driving circuit 60, when receiving the signal, switches the imaging mode to the still picture imaging mode. The still picture which has been captured is recorded onto a recording medium.

Further, the driving circuit 60 can provide a plurality of read modes in which a CCD output signal is read from the CCD image sensor at different reading rates. For example, in the motion picture imaging mode, pixel signals are read out at a rate of 30 frames per second. In the still picture imaging mode, on the other hand, the interval between imaging of a still picture and imaging of another still picture can generally be set to 1/30 second or more, in which case pixel signals can be read out at a lower rate than that of the motion picture imaging mode.

Further, prior to the still picture imaging, preliminary imaging can be performed for determining the exposure conditions. For example, the preliminary imaging may be actuated when the shutter button is pressed halfway, so that the exposure conditions are detected at timing immediately before the still picture imaging is performed. The still picture imaging is then performed based on the exposure conditions thus detected in the preliminary imaging. The preliminary imaging is set such that an image is exposed and read in a short time, because it is desirable that the preliminary imaging is completed when the still picture imaging is instructed. Accordingly, the driving circuit 60 is so constructed that it reads out the pixel signals in the preliminary imaging mode at a higher rate than that in the motion picture imaging.

In the present invention, conductance of the channel of the control transistor is controlled so that the output amplifier characteristics suitable for each of the above-mentioned operation states can be obtained. Namely, for the still picture imaging mode, a gate voltage $V_{SC1}$ which causes a relatively large current to flow in the source follower circuit of the output amplifier 46 is applied to the control transistor, so that a pixel signal of preferable image quality is output. Due to the large current flowing in the source follower circuit, the frequency characteristics of the source follower circuit are improved and deterioration of the waveforms of the image signal is reduced, thereby ensuring the quality of the image. The output control circuit 62 holds the digital value in accordance with this voltage $V_{SC1}$, and, when the driving circuit 60 drives the CCD image sensor 30 in the still picture imaging mode, the output control circuit 62 reads out the digital value, which is then output to the DAC 66.

In the motion picture imaging mode, on the other hand, image quality generally need not be as high as in the still picture imaging mode. Therefore, in the motion picture imaging mode, the frequency characteristics of the output amplifier 46 be improved to the same degree as in the still picture imaging mode. It is not also necessary that a large current which is as large as that in the still picture imaging mode flows in the source follower circuit of the output amplifier 46. In this manner, in the motion picture imaging mode, a gate voltage $V_{SC2}$ which causes a current smaller than that in the still picture imaging mode to flow is applied to the control transistor, which results in a reduction in power consumption. In particular, in the operation of a digital still camera, because motion picture imaging takes a longer time than still picture imaging, the effect of reduction in power consumption in the motion picture imaging mode significantly contributes to extending the operation time of the digital camera.

In the device of this embodiment, because a P-channel MOSFET is used for the control transistor, the lower the gate voltage, the larger the conductance of the channel of the control transistor and the larger the amount of current flowing in the source follower circuit. Therefore, in the present invention, $V_{SC1} < V_{SC2}$ is satisfied.

It is also possible to change the gate voltage of the control transistor in accordance with the reading rate of the CCD output. As described above, the device according to this embodiment can be driven in the motion picture imaging mode, the still picture imaging mode, and the preliminary imaging operation, in which a pixel signal is read out at different rates. For example, the device is so constructed that a signal is read out at a higher rate in the preliminary imaging operation than in the motion picture imaging mode. Assuming that the preliminary imaging operation requires the same level of image quality as that in the motion picture imaging mode, superior frequency characteristics of the output amplifier 46 are required for the preliminary imaging operation because of the higher reading rate. Therefore, according to this embodiment, in the preliminary imaging operation, a gate voltage $V_{SC3}$ which causes a sufficient current to flow in the source follower amplification circuit is applied to the control transistor, and in the motion picture imaging mode which occupies a large ratio in the operation period of the present device, a gate voltage $V_{SC2}$, which makes a current flowing in the source follower amplification circuit smaller than the current in the preliminary imaging operation, is applied to the control transistor. The output control circuit 62 holds the digital data in accordance with this voltage $V_{SC3}$, and in the preliminary imaging operation, reads out and outputs this digital value to the DAC 66. In this manner, the output control circuit 62 controls the gate voltage of the control transistor such that necessary and sufficient current flows in the output amplifier 46 in accordance with the operation state of the CCD image sensor 30, thereby reducing unnecessary power consumption.

EMBODIMENT 2

Figure 3:
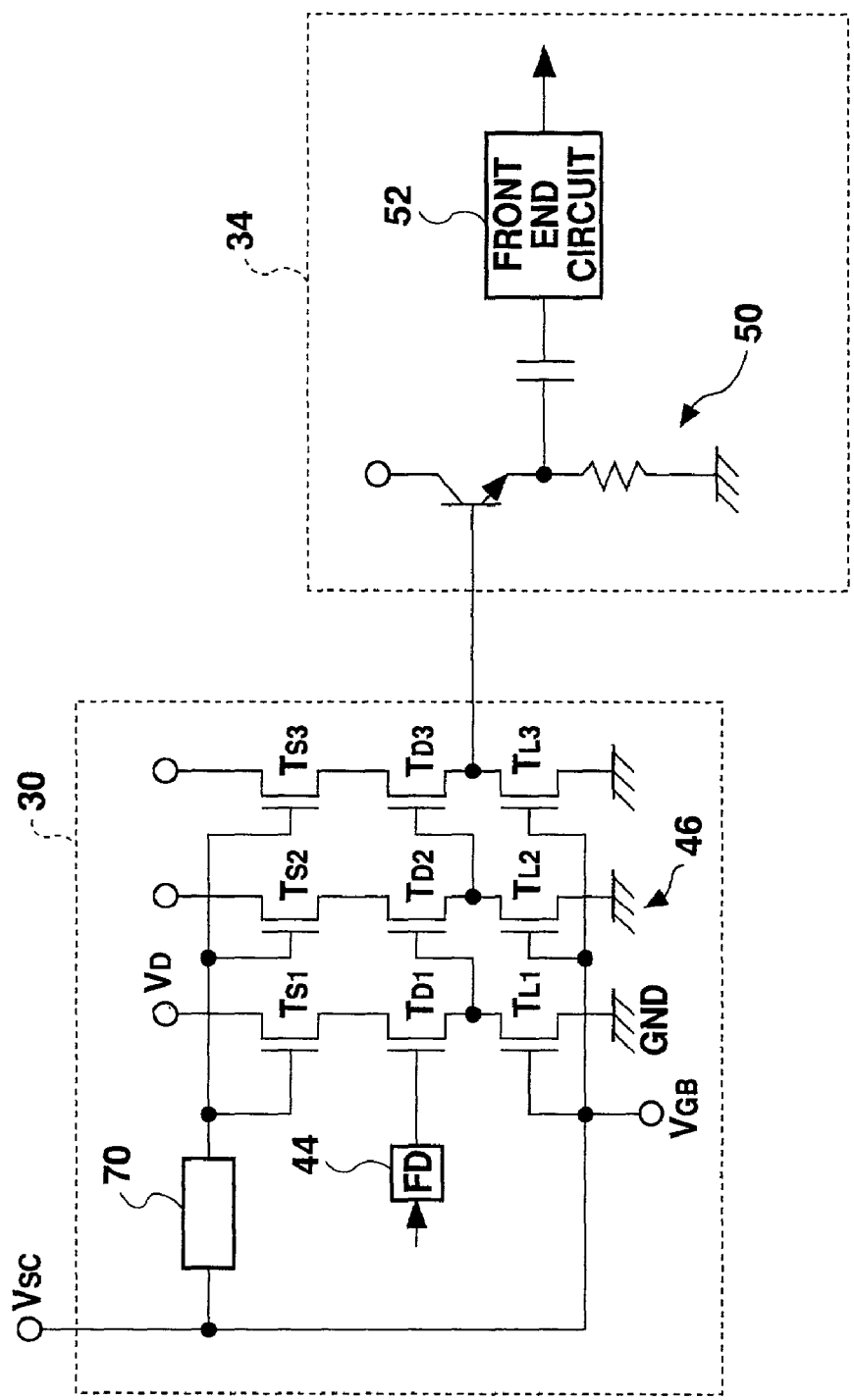
FIG. 3 is a schematic circuit diagram showing the structure of a main portion of a solid-state imaging device in accordance with a second embodiment of the present invention.

FIG. 3 is a schematic circuit diagram showing a main part of a solid-state imaging device of a second embodiment of the present invention. In FIG. 3, the same elements as those in FIG. 2 are designated by the same numerals, and there detailed description will not be repeated. Further, the imaging section 40 of the CCD sensor 30 and the CCD control LSI 32, which have structures similar to those shown in FIG. 2, are not shown in FIG. 3. The device of this embodiment differs from the device in the previous embodiment in that the gate of the control transistor and the gate of the load transistor are connected to the same input terminal $V_{SC}$ of the CCD image sensor 30. By sharing the input terminal as described above, it is possible to reduce the number of pins of the IC package of the CCD image sensor 30.

A control signal generating circuit 70 is provided between the input terminal $V_{SC}$ and the gate of the control transistor. The gate of the load transistor, on the other hand, is directly connected to the input terminal $V_{SC}$. A binary voltage signal having two levels, H level (voltage $V_H$) and L level (voltage $V_L$) is input to $V_{SC}$ from the output control circuit 62. Here, voltages which the control signal generating circuit 70 outputs with regard to the input voltage $V_H$ and $V_L$ are expressed as $V_H'$ and $V_L'$, respectively. Both $V_H$ and $V_L$ are set so as to satisfy the condition that the load transistor is put into an on state. $V_H'$ and $V_L'$, on the other hand, are set so as to satisfy the condition that either of these voltages turns the control transistor on and the other turns the control transistor off. $V_H$ and $V_L$ are determined, and the control signal generating circuit 70 is constructed, so as to satisfy the above conditions.

For example, assume that $V_H=7$ and $V_L=2$. The load transistor, which is of an N-channel depression type, maintains an on state with respect to the $V_{SC}$ signal which is a positive voltage $V_H$ or $V_L$. The control signal output circuit 70 comprises a comparator having a threshold value between $V_H$ and $V_L$, for example, and an inverter connected to the output of the comparator. The comparator outputs voltages 0V, $V_D$ corresponding, for example, to a logical value "0", "1", with respect to $V_H$ and $V_L$. The inverter inverts the logical value to output $V_D$ for the input voltage 0V and output 0V for the input voltage $V_D$. In this manner, the control signal generating circuit 70 outputs $V_H'=0V$, and $V_L'=V_D$. The control transistor, which is of a P-channel enhancement type and whose drain is connected to the power source $V_D$, turns on with regard to $V_H'=0V$, and turns off with regard to $V_L'=V_D$.

By maintaining the on state of the load transistor while the control transistor is in an off state, the base bias voltage of the emitter follower amplification circuit 50, which is a peripheral circuit using NPN transistors, shifts to the ground potential, as in Embodiment 1 above. Thus, the operation of the emitter follower amplification circuit 50 can be halted in cooperation with the halt of the output amplifier 46, so that power consumption can be reduced. The conditions for turning on and off the control transistor are similar to those in Embodiment 1.

In accordance with the charge transfer device of the present invention, a control transistor is provided in the source follower amplification circuit constituting an output amplifier of the charge transfer device, and the gate voltage of the control transistor is controlled so that discontinuous control or variable control can be performed for current flowing in the source follower amplification circuit. This leads to an advantage that the current flowing in the output amplifier can be reduced to thereby reduce power consumption in the charge transfer device. Further, by constructing the device such that the emitter follower amplification circuit or the source follower amplification circuit connected to the output terminal of the charge transfer device turn on while the control transistor turns on, power consumption in the emitter follower amplification circuit or the source follower amplification circuit, which is a peripheral circuit, can also be reduced. Also, by turning the control transistor off to deactivate the operation of the output amplifier during the intermittence of a pixel signal read from the CCD image sensor, power consumption in the output amplifier can be reduced, thereby preventing the output of unnecessary voltage changes from the charge transfer device during that period.

While the preferred embodiments of the present invention have been described using specific terms, such description is for illustrative purposes only, and it is to be understood that changes and variations may be made without departing from the spirit or scope of the appended claims.

What is claimed is:

1. A charge transfer device having a source follower amplification circuit,
wherein the source follower amplification circuit comprises:
an amplification transistor which receives, at a gate, a voltage signal from an output section and outputs, from a source, an output signal corresponding to a change in the voltage signal;
a load transistor connected between the amplification transistor and a first power source for causing a constant current to flow from the amplification transistor to the side of the first power source, so as to function as a constant current source;
a control transistor connected between the amplification transistor and a second power source, wherein the control transistor controls a current flowing from the second power source to the amplification transistor according to a control signal, to thereby control the current flowing from the amplification transistor to the side of the first power source; and
an output control circuit, connected to a gate of the control transistor, for outputting the control signal for reducing a current flowing from the second power source to the amplification transistor during a period in which a pixel signal, is not read.

2. The charge transfer device according to claim 1, further comprising an input terminal which is commonly connected to a gate of the control transistor and to a gate of the load transistor.

3. The charge transfer device according to claim 2, further comprising a control signal generating circuit provided between the gate of the control transistor and the input terminal for generating the control signal based on an input signal externally input to the input terminal, and the load transistor maintains an on state with regard to the input signal.

4. The charge transfer device according to claim 1, wherein the control transistor is of an enhancement type.

5. The charge transfer device according to claim 4, further comprising an input terminal which is commonly connected to a gate of the control transistor and to a gate of the load transistor.

6. The charge transfer device according to claim 5, further comprising a control signal generating circuit provided between the gate of the control transistor and the input terminal for generating the control signal based on an input signal externally input to the input terminal, and the load transistor maintains an on state with regard to the input signal.

7. A charge transfer device having a source follower amplification circuit, wherein said source follower amplification circuit comprises:
   means for receiving at a gate, a voltage signal from an output section and outputting, from a source, an output signal corresponding to a change in the voltage signal;
   means for causing a constant current to flow from the means for receiving and outputting, to a side of a first power source connected between the means for receiving and outputting and the first power source;
   means for controlling a current flowing from a second power source of the means for receiving and outputting according to a control signal connected between the means for receiving and outputting and the second power source, to thereby control the current flowing from the means for receiving and outputting to the side of the first power source; and
   output control means, connected to the means for controlling a current, for outputting the control signal for reducing a current flowing from the second power source to the means for receiving and outputting during a period in which a pixel signal is not read.

8. The charge transfer device according to claim 7, further comprising an input terminal which is commonly connected to a gate of the means for controlling a current and to a gate of the means for causing a constant current.

9. The charge transfer device according to claim 8, further comprising means for generating the control signal based on an input signal externally input to the input terminal, and the means for causing a constant current maintains an on state with regard to the input signal, the means for generating the control signal is provided between the gate of the means for controlling a current and the input terminal.

10. The charge transfer device according to claim 7, wherein the means for controlling a current is of an enhancement type.

11. The charge transfer device according to claim 10, further comprising an input terminal which is commonly connected to a gate of the means for controlling a current and to a gate of the means for causing a constant current.

12. The charge transfer device according to claim 11, further comprising means for generating the control signal based on an input signal externally input to the input terminal, and the means for causing a constant current maintains an on state with regard to the input signal, the means for generating the control signal is provided between the gate of the means for controlling a current and the input terminal.

13. The charge transfer device according to claim 7, wherein the output control means, outputs the control signal for reducing a current flowing from the second power source to the means for receiving and outputting, while imaging is performed.

14. The charge transfer device according to claim 7, wherein the output control means, outputs the control signal for reducing a current flowing from the second power source to the means for receiving and outputting, according to image quality.

15. The charge transfer device according to claim 1, wherein the period in which a pixel signal is not read includes at least one of a horizontal blanking period and a vertical blanking period.

16. A charge transfer device having a source follower amplification circuit,
   wherein the source follower amplification circuit comprises:
   an amplification transistor which receives, at a gate, a voltage signal from an output section and outputs, from a source, an output signal corresponding to a change in the voltage signal;
   a load transistor connected between the amplification transistor and a first power source for causing a constant current to flow from the amplification transistor to the side of the first power source, so as to function as a constant current source;
   a control transistor connected between the amplification transistor and a second power source, for controlling a current flowing from the second power source to the amplification transistor according to a control signal, to thereby control the current flowing from the amplification transistor to the side of the first power source; and
   an output control circuit connected to the gate of the control transistor, for outputting the control signal for reducing a current flowing from the second power source to the amplification transistor while imaging is performed.

17. A charge transfer device having a source follower amplification circuit,
   wherein the source follower amplification circuit comprises:
   an amplification transistor which receives, at a gate, a voltage signal from an output section and outputs, from a source, an output signal corresponding to a change in the voltage signal;
   a load transistor connected between the amplification transistor and a first power source for causing a constant current to flow from the amplification transistor to the side of the first power source, so as to function as a constant current source;
   a control transistor connected between the amplification transistor and a second power source, for controlling a current flowing from the second power source to the amplification transistor according to a control signal, to thereby control the current flowing from the amplification transistor to the side of the first power source; and
   an output control circuit, connected to the gate of the control transistor, for outputting a control signal for reducing a current flowing from the second power source to the amplification transistor, according to image quality.

* * * * *